US00RE34004E

United States Patent [19]

Rogoff et al.

[11] E Patent Number: Re. 34,004

[45] Reissued Date of Patent: Jul. 21, 1992

[54] SECURE SINGLE SIDEBAND COMMUNICATION SYSTEM USING MODULATED NOISE SUBCARRIER

[75] Inventors: Mortimer Rogoff, Washington, D.C.; Louis A. deRosa, deceased, late of Flemington, N.J., Phyllis deRosa, legal representative

[73] Assignee: ITT Corporation, New York, N.Y.

[21] Appl. No.: 568,668

[22] Filed: Aug. 15, 1990 (Under 37 CFR 1.47)

Related U.S. Patent Documents

Reissue of:

[64] Patent No.: 4,176,316
Issued: Nov. 27, 1979
Appl. No.: 345,296
Filed: Mar. 30, 1953

U.S. Applications:

[63] Continuation of Ser. No. 378,472, Jul. 12, 1989, abandoned, which is a continuation of Ser. No. 4,369, Jan. 15, 1987, abandoned, which is a continuation of Ser. No. 299,469, Sep. 4, 1981, abandoned.

[51] Int. Cl.[5] ..... H04L 9/00
[52] U.S. Cl. ..... 380/34; 375/1
[58] Field of Search ..... 375/1; 380/34

[56] References Cited

U.S. PATENT DOCUMENTS

| | | | |
|---|---|---|---|
| Re. 23,440 | 12/1951 | Earp | 329/31 |
| 1,695,179 | 12/1928 | Clement | 380/6 |
| 1,922,282 | 8/1933 | De Bellescize | 375/83 |
| 2,095,050 | 10/1937 | Beverage | 455/61 |
| 2,207,620 | 7/1940 | Hilferty | 455/63 |
| 2,401,447 | 6/1946 | Wipff | 380/6 |
| 2,406,841 | 9/1946 | Levy | 380/6 |
| 2,418,119 | 4/1947 | Hansen | 380/6 |
| 2,580,148 | 12/1951 | Wirkler | 455/304 |
| 2,658,992 | 11/1953 | Byrne | 455/1 |
| 2,693,908 | 11/1954 | Favre | 340/825.36 X |
| 2,792,493 | 5/1957 | Duckett et al. | 380/33 |

OTHER PUBLICATIONS

Polkinghorn et al., "A Single Sideband Short-Wave System for Transatlantic Telephony," (Bell System Monograph B-872), Proceedings of the Institute of Radio Engineers, vol. 23, No. 7, pp. 701-718, Jul. 1935.

*Primary Examiner*—Salvatore Cangialosi
*Attorney, Agent, or Firm*—Thomas N. Twomey

EXEMPLARY CLAIM

10. A transmitter for a secret communication system comprising a source of carrier frequency energy, a source of cyclically repetitive noise energy, means to synchronize the cyclical repetition rate of said noise energy with a sub-multiple of the frequency of said carrier frequency energy, means to reverse the phase of portions of said noise energy in accordance with a predetermined message code, means to modulate said carrier frequency energy with said encoded noise energy and means to transmit the suppressed carrier single sideband component of said carrier modulation.

19 Claims, 3 Drawing Sheets

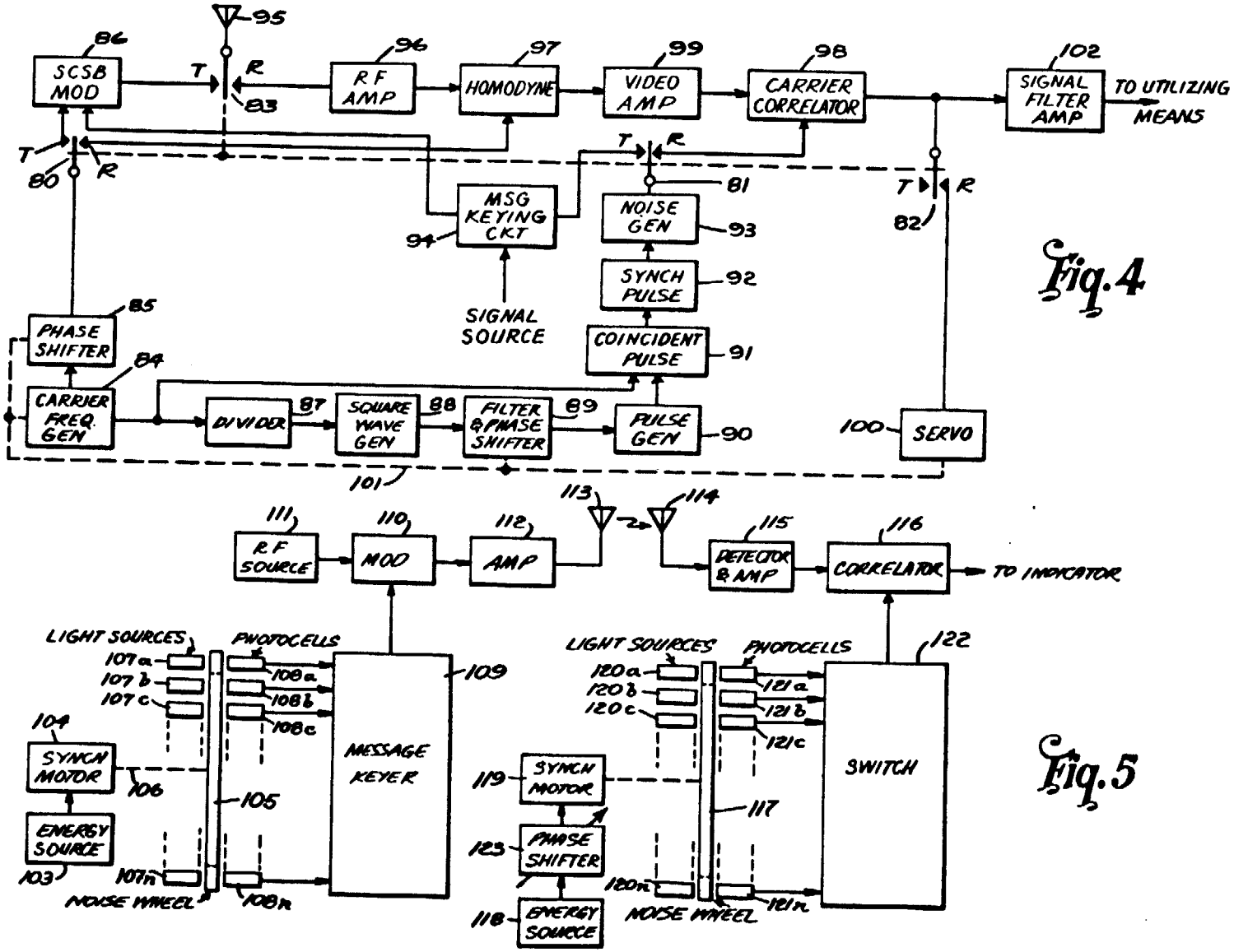
Fig. 4
Fig. 5
TO UTILIZING MEANS
SIGNAL FILTER AMP
CARRIER CORRELATOR
VIDEO AMP
HOMODYNE
RF AMP
SCSB MOD
MSG KEYING CKT
SIGNAL SOURCE
NOISE GEN
SYNCH PULSE
COINCIDENT PULSE
PULSE GEN
FILTER & PHASE SHIFTER
SQUARE WAVE GEN
DIVIDER
CARRIER FREQ. GEN
PHASE SHIFTER
SERVO
TO INDICATOR
CORRELATOR
DETECTOR & AMP
AMP
MOD
RF SOURCE
MESSAGE KEYER
SWITCH
PHOTOCELLS
LIGHT SOURCES
NOISE WHEEL
SYNCH MOTOR
ENERGY SOURCE
PHASE SHIFTER

SECURE SINGLE SIDEBAND COMMUNICATION SYSTEM USING MODULATED NOISE SUBCARRIER

Matter enclosed in heavy brackets [ ] appears in the original patent but forms no part of this reissue specification; matter printed in italics indicates the additions made by reissue.

*This application is a continuation of application Ser. No. 07/378,472 filed Jul. 12, 1989 now abandoned, which is a continuation of application Ser. No. 07/004,369, filed Jan. 15, 1987, now abandoned, which is a continuation of application Ser. No. 299,469, filed Sep. 4, 1981, now abandoned; which is a Reissue application of U.S. Pat. No. 4,176,316, granted Nov. 27, 1979.*

This invention relates to communication systems and more particularly to a secure communication system in which the signal messages are transmitted at extremely low levels.

It is well known in the prior art to mask a message signal with noise. Such known systems have in the past added to the message signal a masking signal consisting of a random series of frequencies. At the receiver a replica of the masking signal was provided. This replica of the masking signal was substracted from the received signal yielding the unmasked message signal. Such a prior art system provided a degree of secrecy, but the presence of a message signal was apparent to unauthorized persons who could perform the same decoding function as the intended recipient of the message.

A second known type of secret communication system utilizes a "flash" type of transmission. The message is emitted in a brief burst of relatively high power. Unauthorized persons in effect were aware when a transmission occurred, and the decoding of such a secrecy system merely became a matter of analyzing the flashed transmission.

A secure communication system should not alert unauthorized receiving points to the fact that a message is being transmitted. In addition such an ideal secure system's transmission should not be easily decoded if it should be received by unauthorized stations.

One of the objects of this invention, therefore, is to provide a secure communication system capable of operation on channels normally used for communication.

Another object of this invention is to provide a secure communication system and method whose transmissions occurs at extremely low power levels and whose message signals are innundated in the random noises resulting from atmospheric effects and system components.

A further object of this invention is to provide a secret communication system which transmits at power levels at which conventional receivers are unable to successfully extract signals and wherein an authorized receiver of the system performs successful demodulation of extremely weak signals in the presence of noise thus obtaining authorized reception while effectively denying unauthorized reception.

In accordance with one feature of this invention a "noise" signal is used as the sub-carrier for the message, which is impressed on the sub-carrier by reversing the phase of the noise signal to indicate a "mark" or pulse character and using the direct phase as a "space" or blank character. The "noise" signal is a portion of random noise taken over some finite interval of time and is repeated in a periodic fashion to generate a continuous noise voltage which modulates a carrier. By a "noise" signal is meant a signal that varies randomly (in amplitude) over a given period of time and has no discernible periodic components. If this noise signal is repeated, however, it then becomes a periodic signal, but if the given period of time over which the signal extends is sufficiently long (such as, for example, the length of a single message), the fact that the noise signal is being repeated will not be discernible and the presence of a noise signal will be extremely difficult to detect. The communication channel is effectively utilized by transmitting a suppressed carrier signal sideband modulation signal at a low power level and having the receiver enhance the signal-to-noise ratio. The enhancement is obtained by transmitting in a broad frequency band, noise subcarrier which is wider than necessary to sustain the signalling rates and then, in effect, contracting the band width at the receiver. Since the noise subcarrier is a repetitive function a complete description of the modulation envelope is available at the receiver to be utilized as an aid in demodulation, enabling the receiver to detect extremely weak signals innundated in atmospheric noise.

Another feature of this invention in the use of a coherent carrier frequency and noise sub-carrier basic repetition rate which enables the receiver to automatically obtain a maximum cross correlation output between the received modulation envelope and a locally generated noise envelope.

The above-mentioned and other features and objects of this invention will become more apparent by reference to the following description taken in conjunction with accompanying drawings, wherein.

Figure 1:
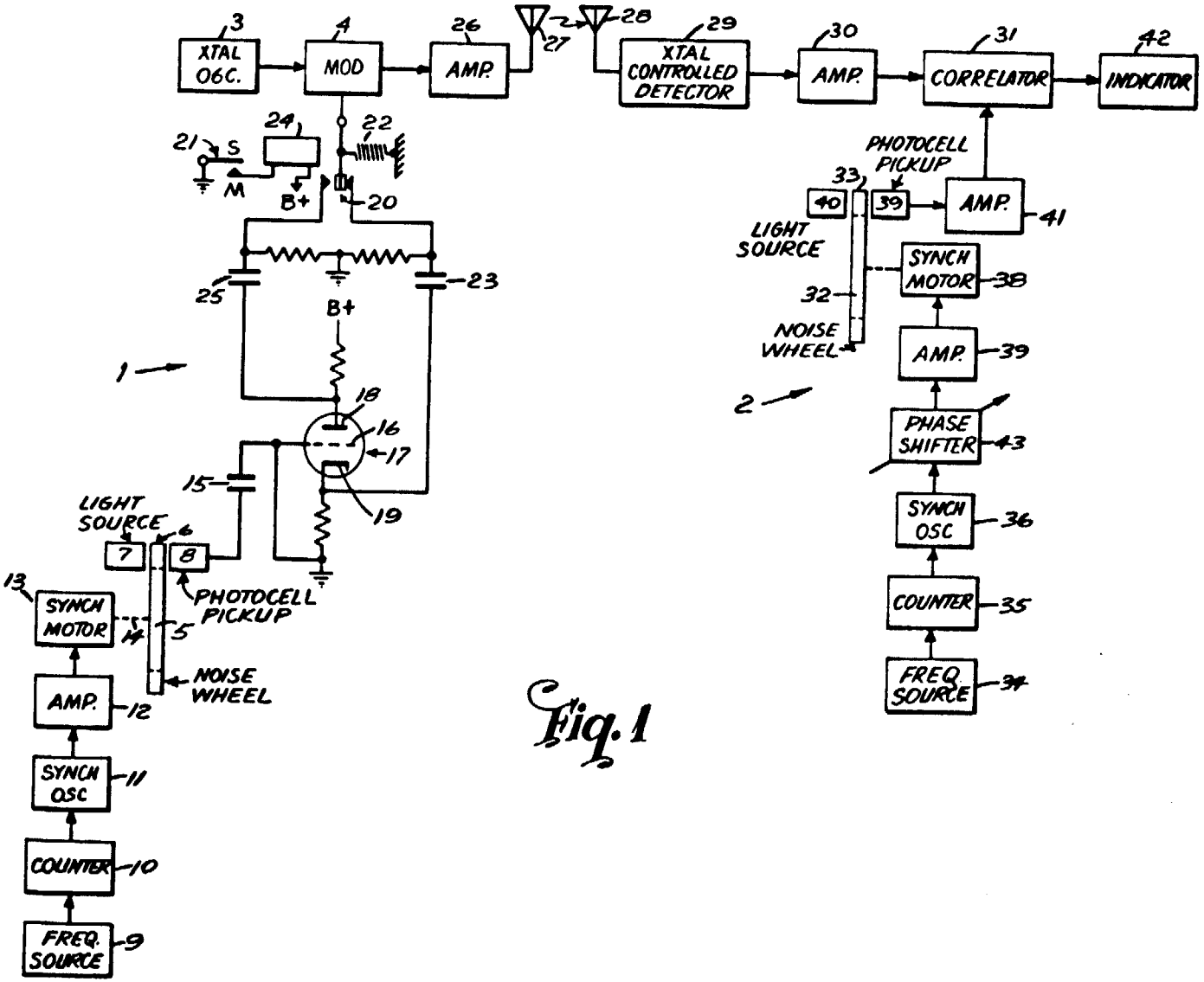
FIG. 1 is a schematic illustration in block form of a communication system in accordance with the principles of this invention.

Referring to FIG. 1, a schematic diagram in block form of one embodiment of a secure communication system in accordance with the principles of this invention is shown, comprising transmitter equipment 1 and receiving equipment 2. The transmitter equipment 1 includes a stable carrier frequency generator herein shown as a crystal controlled oscillator 3 whose output is coupled to a modulator 4. A source of random frequencies or noise is provided by noise wheel 5 which has its rim 6 composed of a transparent or translucent material. Portions of rim 6 are made opaque in such a manner than when light from source 7 is passed through rim 6 the photo-cell 8 will detect a quantity of light which will vary in a random manner as noise wheel 5 is rotated. In order to rotate noise wheel 5 energy at a given frequency is provided from source 9 and coupled through a counter 10 which provides a check on the output of source 9 and insures that a given frequency is coupled to synchronous oscillator 11. The output of oscillator 11 is coupled through an amplifier 12 to a synchronous motor 13 which drives noise wheel 5 through a mechanical coupling 14. The amount of light varies as it passes through rim 6 from source 7 and is detected by photo-cell 8 whose output comprises a random set of frequencies or noise. The noise is coupled through a coupling condenser 15 to the grid 16 of triode 17. The input to modulator 4 comprises the output of triode 17 which may be taken from either the anode 18 or cathode 19 depending upon the position of switch 20. The armature of switch 20 is dependent upon the position of key 21. When key 21 is open, spring 22 pulls the armature of switch 20 to the right or "space" position and couples energy from the cathode 19 through condenser 23 to modulator 4. When the key 21 is closed current is passed through the coil of electromagnet 24 causing the armature of switch 20 to move to the left or "mark" position thus coupling energy from the anode 18 of triode 17 through condenser 25 to the modulator 4. As is well known to those skilled in the art when energy is coupled from the anode 18 it undergoes a phase reversal which indicates a mark or pulse character. In modulator 4 the radio frequency energy from oscillator 3 provides a carrier signal for the noise energy output of noise wheel 5 and triode 17. The modulated carrier output from modulator 4 is amplified in circuit 26 and radiated by transmitting antenna 27.

At the receiver equipment 2 antenna 28 couples the radiated energy to a crystal controlled detector 29 whose output comprising the demodulated noise signal is coupled through amplifier 30 to a correlator circuit 31. *A typical correlator circuit which can be used is described in U.S. Pat. No. 2,253,975 (G. Guanella) and 2,250,148 (W. H. Wirkler), and co-pending application Ser. Nos. 139,664 (L. A. DeRosa et al.), 240,414 (H. C. Harris et al.), and 109,786 (Y. W. Lee et al.), now U.S. Pat. Nos. 2,718,638, 2,941,202, and 2,643,819, respectively. Such a correlator circuit consists of a multiplier and an integrating circuit.* At the receiver a noise wheel 32 is provided which has portions of its transparent rim 33 opaqued in a manner identical with the opaque markings applied to the rim 6 of noise wheel 5 at the transmitter. Thus, whatever technique is used to produce the opaque markings on noise wheel 5, such as by photographic recording of light from a modulated light source controlled by a conventional noise generator, the same technique may be simultaneously applied to record the same noise modulation on noise wheel 32. A frequency source 34 has its output coupled through a counter circuit 35 to a synchronous oscillator 36 to provide a source of energy which when passed through amplifier 37 to a synchronous motor 38 causes noise wheel 32 to rotate at the same speed as the noise wheel 5. Photo-cell 39 receives varying amounts of light from source 40 dependent upon the opaquing of rim 33. Since the rim 33 is identical to rim 6 the output of photo-cell 39 will be a noise signal identical to the output of photo-cell 8 in the transmitter. The noise signal from photo-cell 33 is coupled through amplifier 41 to correlator 31. If the noise signal from amplifier 41 is in synchronism with the noise signal transmitted and detected in detector 29 the output of the correlator 31 coupled to indicator 42 will be a maximum. However if the noise wheels 5 and 32 are not in synchronism the output of correlator 32 will not be a maximum. Prior to transmitting a message the transmitter equipment 1 emits an unmodulated noise signal which is received by equipment 2. Phase shifter 43 permits the rotation of noise wheel 32 to be adjusted until a maximum output from correlator 31 is obtained. Once this condition exists the two noise wheels will remain in synchronism and the message may be transmitted. At the receiver a "mark" or pulse is indicated in the output of the correlator 31 when the detected noise from transmitter equipment 1 is out of phase with the locally generated noise and a minimum voltage appears at the output, and a space or blank will be indicated by the detected noise and locally generated noise signals being in phase, thereby producing a maximum voltage output from correlator 31.

Figure 2:
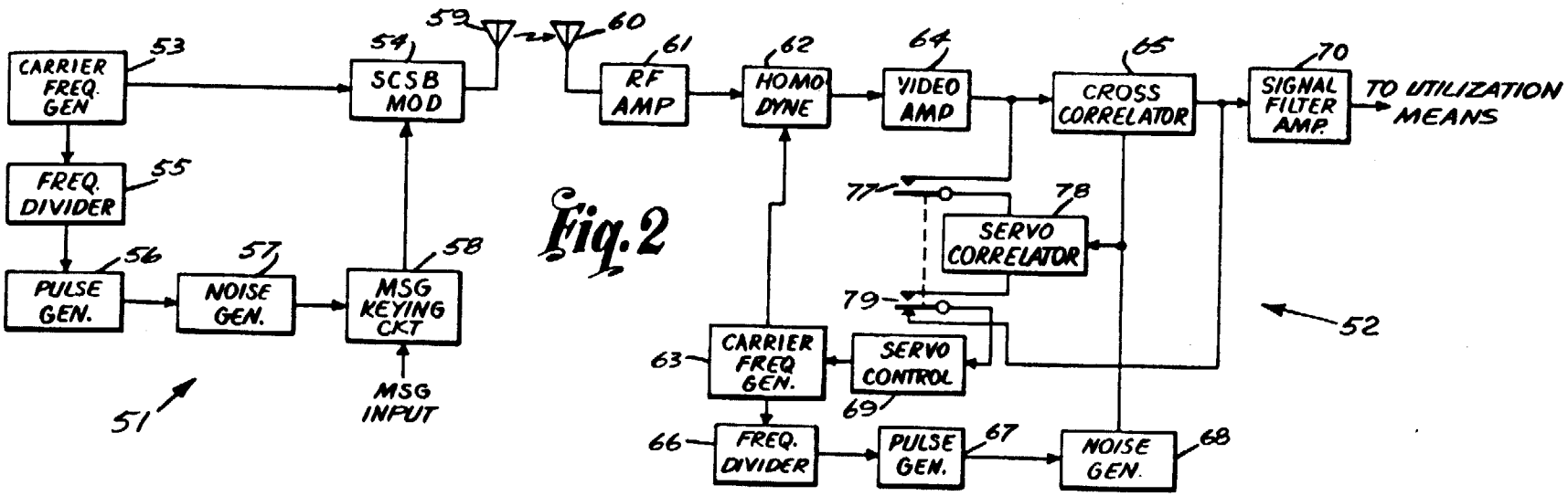
FIG. 2 is a schematic diagram in block form of one embodiment of this invention for use in one-way communication.

Referring to FIG. 2, the schematic diagram in block form of a one-way secure radio communication system in accordance with the principles of this invention is shown comprising transmitter equipment 51 and receiving equipment 52. The transmitter equipment includes a stable carrier frequency generator 53 whose output is simultaneously coupled to a suppressed carrier, single sideband modulator 54 and to a frequency divider 55. The output of divider 55, which is the carrier frequency divided down to provide a basic repetition rate for a "noise" message sub-carrier, is applied to a pulse generator 56 whose output is a train of pulses at the basic repetition rate which is a sub-multiple of the carrier frequency and which are utilized to synchronize a noise generator 57. Noise generator 57 may consist of the same elements 5, 7, and 8, as in FIG. 1. The output of noise generator 57 which is coherent in phase and frequency with respect to the carrier signal from generator 53, is coupled through a message keying circuit 58 to modulator 54 to create a transmitter signal spectrum emitted from antenna 59 consisting of a continuum of sideband frequencies corresponding to the noise message sub-carrier. The message keying provided by circuit 58 is inserted as phase modulation of the output of the noise generator 57. The phase modulation is accomplished by coupling the output of generator 57 to modulator 54 either directly or by passing it through an amplifier stage that inverts all phases. Thus space and mark indications, i.e., blank and pulse, are obtained.

The receiving equipment 52 located at a point remote from the transmitter 51 includes a receiving antenna 60 coupling the suppressed carrier sideband received signal through a usual radio frequency amplifier 61 to a homodyne detector 62. A generator 63 provides a carrier frequency signal at the same frequency and phase as the signal output of generator 53 in the transmitter 51. The carrier frequency energy from generator 63 is reinserted into the received signal in the homodyne detector 62. The output of detector 62 is coupled through a video amplifier 64 to a cross correlator 65. Simultaneously the carrier frequency output of generator 63 is divided down in circuit 66 to provide basic repetition rate for the noise message carrier in a manner similar to that of the transmitter, i.e., the output of divider 66 is coupled to a pulse generator 67 whose output synchronizes a noise generator 68. Thus the output of the noise generator 68, which may consist of the same element 5, 7, and 8, as in FIG. 1, is identical to the output of the generator 57 in the transmitter 51, and is coupled to provide a second input to the cross correlator 65. Cross correlator 65 obtains the instantaneous product of its two input signals, the first from video amplifier 64 and the second from noise generator 68. The control 69 for generator 63 may be operated to vary the output of generator 63 until a maximum correlation function is obtained. After control 69 is set for maximum correlation it may be controlled by a servo mechanism from the output of unit 65. A comparison of the phase between the locally generated noise from generator 68 and the received noise sub-carrier yields the message "space" and "mark" characters which are coupled through a signal filter and amplifier circuit 70 to any well-known utilization device.

The use of a "noise" message sub-carrier having a broad frequency band adds to the inherent secrecy of this system since its character is essentially identical to the random noise which is a hindrance to conventional reception techniques. Broadbanding allows the trading of bandwidth for signal-to-noise ratio and the noise like character of the signal adds to its obscurity. In addition the use of low power level transmissions provides the secure communication system of this invention with the ability to mesh its transmissions with the always present random noise. The combined use of a broad frequency band for message transmission and the "noise" character of the transmitter signal yields a measure of secrecy and security which is obtainable in other known systems.

The "noise" message sub-carrier signal can be generated by a variety of means such as rewritings, electro-optical systems or "noise" wheels. In general what is required is a record of a set of random quantities, for example amplitude levels, that can be reproduced to provide copies at both the transmitting and receiving points. These records can be produced manually or preferably by actually recording, for a finite period, a random phenomena. The number of elements to be recorded depends upon the bandwidth and repetition rate of the "noise" signal to be generated. Ideally, this "noise" signal should have a broad bandwidth, consisting of spectral components that are closely spaced; for such a spectrum closely approximates random noise in character. Thus, it is desirable that the basic repetition rate of the noise sub-carrier be low to insure close spacing of spectral components and to prevent the appearance of a characteristic "tone" to the ear. The bandwidth should be as high as is compatible with practical considerations in order to extract the greatest possible enhancement in signal-to-noise ratios by bandwidth reduction at the receiver.

The transmitter is preferably operated as a suppressed carrier system since the presence of a carrier frequency component in the transmitted spectrum can be ascertained by conventional receiver techniques. If the carrier is transmitted the margin of security inherent in the noise sidebands is dissipated because the carrier is on the air for the total duration of the message. The transmitted signal should also have one set of its sidebands eliminated to conserve channel bandwidth.

In order to function properly the secure communication system of this invention requires the maintenance of synchronism between transmitted signals and signals locally generated at the receiver. In the receiver equipment 52 it is obvious that synchronism is required at two points: first, the homodyne detector 62 requires a source of locally generated carrier from generated 63 whose frequency and phase is identical to the suppressed carrier provided at the transmitter 51 by generator 53 and second, the locally generated noise signal input to the correlator 65 from generator 68 must be identical to the signal output of noise generator 57 at the transmitter 51 in both basic repetition frequency and reference phase. This synchronism of noise signals is needed if a stable maximum value of the cross correlation function, i.e., output of correlator 65, is to be obtained.

In order to reduce the number of parameters that must be controlled, a fundamental simplification is provided by making the carrier frequency signal and the noise message sub-carrier generated at the transmitter, coherent in such a manner that the noise message sub-carrier basic repetition frequency is synchronous with the transmitter frequency. This is obtained by utilizing a sub-multiple of the carrier frequency as the synchronizing signal for the noise generator 68.

Figure 3A:
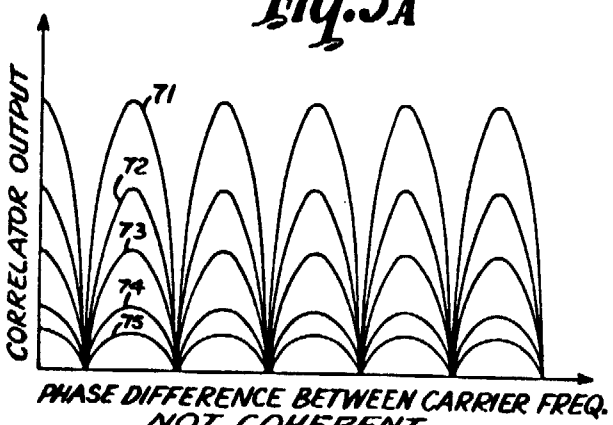
FIGS. 3a and 3b are graphic illustrations of various curves helpful in the explanation of this invention; and, FIG. 4 is a schematic diagram in block form of a secure communication system station for use in two-way communication; and, FIG. 5 is a schematic diagram in block form of an embodiment of our invention for use with a multi-digital message code.

Referring to FIG. 3a the output of the cross correlator (correlation function) is shown plotted as a function of the time delay imposed on the carrier frequency signal generated at the receiver where there is no coherence between the injected carrier and the noise envelope. These curves described the output of the cross correlator as the radio frequency phase difference between the locally generated carrier signal injected into the homodyne detector and the carrier frequency signal generated at the transmitter is varied. It should be pointed out that these curves are approximations in that they are not drawn to scale and phase reversals of the correlator function are not shown and interfering atmospheric or component random noise is ignored. Curve 71 represents the condition wherein both the noise and source at the transmitter and the noise source at the receiver are in perfect synchronism in both frequency and phase so that as the phase of the locally injected carrier is varied it produces variations from maximum to minimum in the values of the correlation function.

As deviations from the co-phasal condition of the noise sources occur as shown in curves 72, 73, 74, and 75, the attainment of perfect synchronism, i.e., frequency and phase, between the transmitter and receiver carrier frequency signals at the homodyne detector will not produce the maximum obtainable values of the correlation function. As the deviation of the noise signals from the co-phasal condition is further increased, the periodic maxima of the correlation function are further reduced until a condition is reached where no correlation is obtainable.

Figure 3B:
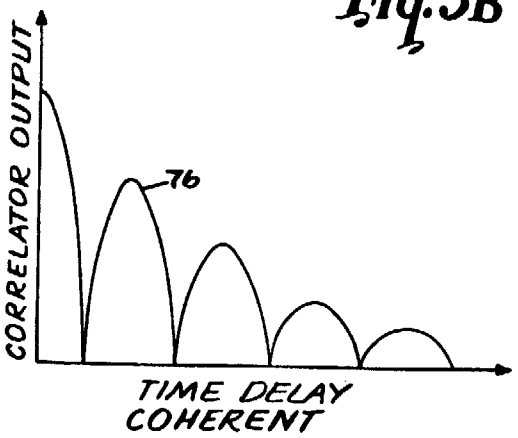

As shown in FIG. 3b curve 76, wherein the cross correlation function is plotted as a function of the homodyning carrier frequency time delay for the condition where the noise sources from the transmitter and receiver are coherent at the receiver, that is held in repetition rate of synchronism with the carrier frequency, the effect of the resulting coherence is shown. As the synchronism at the receiver location between signals generated at the transmitter and receiver is reduced the maximum amplitude of the correlation function is also reduced.

The output of the cross correlator is utilized to operate a servo control system 69 whose output controls the frequency and phase of the locally generated carrier and envelope, with the object of maintaining an in phase condition between the signals generated in the transmitter and those generated in the receiver. This servo control system uses as its error signal the downward drift in amplitude of the cross correlation function as it departs from the maximum obtainable amplitude.

Utilizing the output of cross correlator 65 as the input to servo control 69 introduces complexities which can be eliminated by coupling the output of the amplifier 64 through switch 77 to a pair of servo control correlators 78. The pair of correlators 78 are adjusted so that they will straddle the point of maximum output from correlator 65. Thus when the output of correlator 65 departs from a maximum one of the pair of correlators 78 will have an increased output while the other's output will decrease. When the pair of correlators 78 is utilized to control the servo control 69 switch 79 should be in the upper position disconnecting the output of the correlator 65 from control 69 while connecting the output of correlators 78 to control 69.

Referring to FIG. 4 a schematic illustration in block form of one embodiment of a secure radio communication system station is shown adapted for two-way communication wherein coherence is obtained between the noise sub-carrier envelope and the carrier frequency components at the transmitter and receiver. A large portion of the equipment necessary for transmitting a message is also used for receiving a message from a distant transmitter thus allowing great economies in the use of component equipment.

When functioning as a transmitter the switches 80, 81, 82, and 83 are moved to their "T" or transmit position. The output of a stable carrier frequency generator 84 is coupled through phase shifter 85 and switch 80 to a suppressed carrier, single sideband modulator 86. The carrier frequency output of generator 84 is also coupled through frequency divider circuit 87 to produce in the output of generator 88 a square wave at a frequency which is a sub-multiple of the carrier frequency from generator 64. The square wave generator 88 output is filtered and passed through a phase shifter in circuit 89 whose output synchronizes the signals of pulse generator 90. Both the output of the carrier frequency generator 84 and the pulse generator 90 are coupled to a usual coincidence circuit 91. An output occurs from circuit 91 only when the input signals from generators 84 and 91 are coincident. The coincident output of circuit 91 triggers the synchronous pulse generator 92 to emit a pulse which is used to produce a basic repetition rate for noise generator 93. Thus the basic repetition rate of the noise generator 93 is controlled by a sub-multiple of the carrier frequency and coherence between the noise message sub-carrier and the carrier frequency signal is secured. The output of the noise generator 93 is coupled through switch 81 to the message keying circuit 94 where the message is impressed on the noise sub-carrier by encoding the message into "mark" and "space" signals, each "mark" being indicated by causing the phase of the output of noise generator 93 to be reversed. The encoded noise message carrier and the carrier frequency energy are coupled to the suppressed carrier single sideband modulator 86 and thence to antenna 95 through switch 83.

When functioning as a receiver, switches 80, 81, 82, and 83 are moved to the "R" or receiving position and the incoming signal from antenna 95 is coupled to a tuned radio frequency amplifier 96 through switch 83. The output of amplifier 96 is coupled to homodyne detector 97.

The use of homodyning in the secure communication system of this invention enhances the successful operation. In order for the receiver to demodulate extremely weak signals in the presence of random or atmospheric noise the received signals must not be degraded by the action of conventional signal detectors. The homodyne detector possesses the property of preserving signal-to-noise ratios as it demodulates the signal. The homodyne first detector 97 is similar to the conventional mixer of a superheterodyne receiver, however, it differs in that the locally injected signal instead of being at a fixed difference frequency from the receiver carrier is at exactly the frequency of the input signal carrier. Moreover for equal faithful, stable demodulation of the received modulation envelope the frequency and phase of the locally injected carrier must bear a constant relationship to its counterpart in the transmitter.

In order to provide a local source of carrier signals in the receiver at the same frequency and in phase with the source of carrier frequency at the transmitter the output of carrier frequency generator 84 is coupled through phase shifter 85 and switch 80 to provide the homodyne detector 97 with a zero beating signal source for the homodyning process. The output of the hymodyne detector 97 is a replica of the noise message sub-carrier generated at the transmitter plus demodulated random noise present at the homodyne detector input. Since the homodyne detector 97 is one variety of a cross correlator, its use does not degrade the signal-to-noise ratio in the receiving system.

The output of the carrier frequency generator 84 is divided down in frequency to produce the basic repetition rate of the "noise" signal duplicate generated at the receiver. This dividing down process in the receiver is identical to the one performed in the transmitter. The output of the noise generator 93 is applied to one input of a cross correlator 98 through switch 81. The other input to the cross correlator 88 is the output of the homodyne detector 97 which is the desired transmitted noise signal immersed in random noise, amplified in video amplifier 99.

Successful demodulation is obtained at the cross correlator 98 when the locally generated noise signal from generator 93 is correctly phased and operated at the same repetition frequency as the incoming noise message carrier. As heretofore explained, this condition yields the maximum correlation, hence the maximum output from the cross correlator 98.

Since the transmitted carrier frequency and noise message carrier is made coherent, and this coherence is maintained in the receiver generated carrier frequency signal and noise message sub-carrier, the control circuit is simplified. The output of the cross correlator 98 is coupled through switch 82 to operate a servo control 100 whose function is to control the frequency and phase of the locally generated carrier and noise message signals. The downward drift in amplitude of the output of the cross correlator 98 provides an error signal for the servo 100 whose output shaft 101 controls phase shifter 85 and generator 84 to adjust the phase and frequency of the locally generated carrier signal from generator 84 before it is coupled to the homodyne detector 97, and corrects any drift in the phase and frequency of the locally generated noise message sub-carrier generator 93 by controlling the phase, in phase shifter 89, of the square wave generator 88 output before it is coupled to pulse generator 90. Of course, the speed of action of the servo control 100 must be sufficient to prevent distortion of the demodulated keyed characters. It is obvious to those skilled in the art that a pair of servo control correlators may be utilized to control the servo control 100 in a manner similar to the use of correlators 78 in the embodiment shown in FIG. 2.

The use of the homodyne detector and cross correlator for signal demodulation is a departure from conventional receiving techniques whose successful employment is due to the fact that a repetitive noise message sub-carrier is being used, i.e. the noise message sub-carrier can be synchronized with the transmitter carrier signal so that the final output of the cross correlator 98 can be used to correct for any lack of synchronism in the communication system. If non-repetitive signals were transmitted the values of the cross correlation would not be predictable in advance hence no error signal could be obtained.

The output of cross correlator 98 indicates when the noise message carrier at the transmitter was "keyed" so that its phase was reversed, hence phase reversals or "mark" and "space" characters of the message are obtained. These message characters are coupled through a signal filter amplifier 102 to any well-known utilization device.

The embodiments of this invention hereinabove described show the correlation occurring between the transmitted and locally generated noise signal but it is apparent that equal success can be achieved by having the correlation occur at an intermediate frequency.

The secure communication system of this invention is adaptable to any type of existing communication channel. However, it should be pointed out that the depth to which the transmitted signals can be immersed in noise (for a given signalling rate) depends upon the bandwidth available in the communication channel. Hence employing this secret system on a conventional wire (300–3000 cycles per second) wire channel imposes a limit on the signalling rate if adequate secrecy is to be obtained.

Referring to FIG. 5, an alternate embodiment of a secure transmission system in accordance with the principles of this invention is shown for use with a multidigital message code. A source of energy 103 is coupled to a synchronous motor 104 which drives noise wheel 105 through mechanical linkage 106. This noise wheel drive is similar to the driving mechanism shown in greater detail in FIG. 1. Around the periphery of the transparent rim of noise wheel 105 are a plurality of light sources 107a, 107b, 107c . . . 107n and associate photocell pick ups 180a, 108b, 108c . . . 108n. We have found that one photo-cell pick up unit can be located on each degree of the noise wheel's circumference thus providing 360 separate pick up units. A message keyer circuit 109 couples the output of any one of the photocells 108 to a modulator 110 where a radio frequency from source 111 is modulated by the noise subcarrier. The output of modulator 110 is coupled through amplifier 112 to antenna 113 where it is transmitted.

The received energy is coupled from antenna 114 through a detector and amplifier circuit 115 to a correlator 116. A noise wheel 117 is driven by the output of the energy source 118 and synchronous motor 119 to provide a locally generated noise signal. A plurality of light sources 120a, 120b, 120c . . . 120n and associate photo-cell pick up units 121a, 121b, 121c . . . 121n are located around the periphery of noise wheel 117 in a manner identical with the location of photo-cells 108 relative to noise wheel 105 in the transmitter equipment. A switch 122 is provided to couple the output of any photo-cell 121 to the correlator 116 whose output is coupled to the usual indicator or utilization circuitry.

Prior to the transmission of any message, photo-cell 108a is coupled by message keyer 109 to modulator 110 and photo-cell 121a is coupled by switch 122 to correlator 116. Phase shifter 123 is adjusted until the output of correlator 116 indicates a maximum which indicates that the transmitter and receiver noise wheels are in synchronism. If the first digit of the multidigit code is to be transmitted photo-cell 108b is coupled by the message keyer 109 to modulator 110. In the receiver switch 122 couples the output of photo-cells 121 to correlator 116 in succession until a maximum output is obtained. This maximum output is obtained from the photo-cell 121 which is in the same relative position to noise wheel 117 as the photo-cell 108, which is coupled through keyer 109 to modulator 110, is to noise wheel 105. Thus by coupling any one of a plurality of photo-cells to modulator 110 any one of a large number of code digits can be transmitted which can be detected at the receiver equipment.

It is obvious that in lieu of a large plurality of photocell pick up units in the receiver and transmitter equipment one pick up unit can be used in each equipment if means are provided to move the one pick up unit around the periphery of the noise wheel.

While we have described above the principles of our invention in connection with specific apparatus, it is to be clearly understood that this description is made only by way of example and not as a limitation to the scope of our invention as set forth in the objects thereof and in the accompanying claims.

[We claim] ∝ *It is claimed:*

1. A secret communication system comprising a source of noise energy, first means to modulate said noise with a message signal, a source of carrier frequency energy, second means to modulate said carrier energy with said modulated noise energy, means to suppress said carrier energy and one of the sidebands of the output of said second modulator means, means to transmit said suppressed carrier single sideband energy, means to receive said transmitted energy, means to demodulate said received signal to obtain said transmitted modulated noise, means to produce a replica of said noise energy at said receiver means, and a correlator responsive to said locally produced noise energy and said transmitted modulated noise energy to produce at the output of said correlator said message signal.

2. A system according to claim 1 wherein said source of noise energy is arranged to produce noise energy over a relatively broad frequency band and the transmitter means is arranged to emit energy at a power level below the level of random atmospheric noise.

3. A system according to claim 1 wherein said first means to modulate comprises a phase inverter.

4. A system according to claim 3 wherein said first modulating means cause the phase of said noise energy to be reversed causing a "mark" character and the phase of said noise energy to pass unaffected to cause a "space" character.

5. A secret communication system comprising a source of cyclically repetitive noise energy, first means to modulate said noise with a message signal, a source of carrier frequency energy, means to provide coherence between said carrier frequency and the cyclical repetition rate of said noise energy, second means to modulate said carrier energy with said modulated noise energy, means to suppress said carrier energy and one of the sidebands of the output of said second modulator means, means to transmit said suppressed carrier single side-band energy, means to receive said transmitted energy, means to demodulate said received signal to obtain said transmitted modulated noise, means to produce a replica of said repetitive noise energy at said receiver means, a correlator to obtain the maximum correlation function between said locally produced noise energy and said demodulated energy and means to obtain from the output of said correlator said message signal.

6. A system according to claim 5 which further includes a servo control device responsive to the output of said correlator to adjust the phase of said locally produced noise energy.

7. A system according to claim 5 wherein said means to demodulate said received signal further includes a local source of carrier frequency energy whose output is identical to the carrier frequency energy at the transmitter and means to insert energy of said local source into said received suppressed carrier single sideband energy.

8. A system according to claim 7 which further includes means to shift the phase of said local source of carrier frequency energy responsive to the output of said servo control means.

9. A system according to claim 7 which further includes means to adjust the frequency of said local source of carrier frequency energy responsive to the output of said servo control device.

10. A transmitter for a secret communication system comprising a source of carrier frequency energy, a source of cyclically repetitive noise energy, means to synchronize the cyclical repetition rate of said noise energy with a sub-multiple of the frequency of said carrier frequency energy, means to reverse the phase of portions of said noise energy in accordance with the predetermined message code, means to modulate said carrier frequency energy with said encoded noise energy and means to transmit the suppressed carrier single sideband component of said carrier modulation.

11. A receiver for use in conjunction with a transmitter which emits suppressed carrier single sideband component of carrier frequency energy modulated by a cyclically repetitive random noise signal which is modulated with a message signal, comprising a local source of carrier frequency energy, means to shift the phase of the output of said local source of carrier frequency energy, a homodyne detector to detect said transmitted signal, means to inject the output of said phase shift means to said homodyne detector to recover said modulated noise signal, means to frequency divide the output of said local source of carrier frequency, a local source to produce a replica of said random noise energy, means to synchronize the cyclical repetition rate of said random noise energy with the output frequency of said divider means, means to correlate the output of said local noise generator and said recovered modulated signal, means responsive to the output of said correlation means to control said phase shift means and means to recover said message signal from the output of said correlation means.

12. A transceiver comprising a source of carrier frequency energy, a source of cyclically repetitive noise energy, means to cause the cyclical repetition rate of said noise energy to be coherent with said carrier frequency, a source of message signals, first modulating means, first switching means to couple said message signals and said noise energy to said first modulating means to modulate said noise energy with said message signals, second modulating means, second switching means to couple the output of said first modulating means and said carrier frequency energy to said second modulating means to modulate said carrier frequency energy with said modulated noise energy, means to transmit the suppressed carrier single sideband component of said second modulation, means to receive suppressed carrier single sideband component of a carrier frequency energy modulated by a cyclically repetitive noise signal modulated with a message signal transmitted from a remote point, first means to detect said modulated noise energy including means to cause said second switching means to couple said carrier frequency energy to said first detecting means, a correlator responsive to said detected modulated noise energy and the output of said source of repetitive noise energy including means to cause said first switching means to couple said source of repetitive noise energy to said correlator and means to detect said message signal from the output of said correlator.

13. A transceiver comprising a source of carrier frequency energy, a source of cyclically repetitive noise energy, means to frequency divide the output of said carrier energy, means to synchronize the cyclic repetition rate of said noise energy with the output of said divider means, a source of message signals, first modulating means, first switching means to couple said message signals and said noise energy to said first modulating means to modulate said noise energy with said message signals, second modulating means, second switching means to couple the output of said first modulating means and said carrier frequency energy to said second modulating means to modulate said carrier frequency energy with said modulated noise energy, means to transmit the suppressed carrier single sideband component of said second modulation, means to receive suppressed carrier single sideband component of a carrier frequency energy modulated by a cyclically repetitive noise signal modulated with a message signal transmitted from a remote point, first means to detect said modulated noise energy including means to cause said second switching means to couple said carrier frequency energy to said first detecting means, means to correlate the output of said first detector means and the output of said source of noise energy including means to cause said first switching means to couple said source of noise energy to said correlation means, a servo control device responsive to the output of said correlation means, means to adjust the phase and frequency of said carrier energy responsive to said control device, means to adjust the phase of the cyclic repetition of said noise energy responsive to said control device and means to obtain said message signal from the output of said correlation means.

*14. A secret communication system comprising:*

*a source of noise energy,*

*first means to modulate said noise energy with a message signal to provide a modulated noise signal,*

*a source of carrier frequency energy,*

*second means to modulate said carrier energy with said modulated noise signal to provide a noise modulated carrier signal,*

*means to suppress said carrier energy of said noise modulated carrier signal to provide a noise modulated suppressed carrier signal,*

*means to transmit said noise modulated suppressed carrier signal,*

*means to receive said transmitted signal,*

*means to demodulate said received signal to obtain said modulated noise signal,*

*means to produce a replica of said noise energy at said receiver means, and*

*cross correlation means responsive to said locally produced noise energy and said modulated noise signal to produce at the output of said correlator said message signal.*

*15. A secret communication system comprising:*

*a source of cyclically repetitive noise energy,*

*first means to modulate said noise with a message signal,*

*a source of carrier frequency energy,*

*means to provide coherence between said carrier frequency and the cyclical repetition rate of said noise energy,*

*second means to modulate said carrier energy with said modulated noise energy,*

*means to suppress said carrier energy of the output of said second modulator means,*

*means to transmit said suppressed carrier energy,*

*means to receive said transmitted energy,*

*means to demodulate said received signal to obtain said transmitted modulated noise,*

*means to produce a replica of said repetitive noise energy at said receiver means,*

*a correlator to obtain the maximum correlation function between said locally produced noise energy and said demodulated energy and means to obtain from the output of said correlator said message signal.*

*16. A transmitter for a secret communication system comprising:*

*a source of carrier frequency energy,*

*a source of cyclically repetitive noise energy,*

*means to synchronize the cyclical repetition rate of said noise energy with a sub-multiple of the frequency of said carrier frequency energy,*

*means to reverse the phase of portions of said noise energy in accordance with a predetermined message code,*

*means to modulate said carrier frequency energy with said encoded noise energy, and*

*means to transmit the suppressed carrier component of said carrier modulation.*

*17. A receiver for use in conjunction with a transmitter which emits suppressed carrier component of a carrier frequency energy modulated by a cyclically repetitive random noise signal which is modulated with a message signal, comprising:*

*a local source of carrier frequency energy,*

*means to shift the phase of the output of said local source of carrier frequency energy,*

*a homodyne detector to detect said transmitted signal,*

*means to inject the output of said phase shift means to said homodyne detector to recover said modulated noise signal,*

*means to frequency divide the output of said local source of carrier frequency,*

*a local source to produce a replica of said repetitive random noise signal,*

*means to synchronize the cyclical repetition rate of said random noise signal with the output frequency of said divider means,*

*means to correlate the output of said local noise generator and said recovered modulated signal,*

*means responsive to the output of said correlation means to control said phase shift means, and*

*means to recover said message signal from the output of said correlation means.*

*18. A transceiver comprising:*

*a source of carrier frequency energy,*

*a source of cyclically repetitive noise energy,*

*means to cause the cyclical repetition rate of said noise energy to be coherent with said carrier frequency,*

*a source of message signals,*

*first modulating means,*

*first switching means to couple said message signals and said noise energy to said first modulating means to modulate said noise energy with said message signals,*

*second modulating means,*

*second switching means to couple the output of said first modulating means and said carrier frequency energy to said second modulating means to modulate said carrier frequency energy with said modulated noise energy,*

*means to transmit the suppressed carrier component of said second modulation,*

*means to receive a suppressed carrier component of a carrier frequency energy modulated by a cyclically repetitive noise signal modulated with a message signal transmitted from a remote point,*

*first means to detect said modulated noise energy including means to cause said second switching means to couple said carrier frequency energy to said first detecting means,*

*a correlator responsive to said detected modulated noise energy and the output of said source of repetitive noise energy including means to cause said first switching means to couple said source of repetitive noise energy to said correlator, and*

*means to detect said message signal from the output of said correlator.*

*19. A transceiver comprising:*

*a source of carrier frequency energy,*

*a source of cyclically repetitive noise energy,*

*means to frequency divide the output of said carrier energy,*

*means to synchronize the cyclic repetition rate of said noise energy with the output of said divider means,*

*a source of message signals,*

*first modulating means,*

*first switching means to couple said message signals and said noise energy to said first modulating means to modulate said noise energy with said message signals,*

*second modulating means,*

*second switching means to couple the output of said first modulating means and said carrier frequency energy to said second modulating means to modulate said carrier frequency energy with said modulated noise energy,*

*means to transmit the suppressed carrier component of said second modulation,*

*means to receive a suppressed carrier component of a carrier frequency energy modulated by a cyclically repetitive noise signal modulated with a message signal transmitted from a remote point,*

*first means to detect said modulated noise energy including means to cause said second switching means to couple said carrier frequency energy to said first detecting means,*

*means to correlate the output of said first detector means and the output of said source of noise energy including means to cause said first switching means to couple said source of noise energy to said correlation means,*

*a servo control device responsive to the output of said correlation means,*

*means to adjust the phase and frequency of said carrier energy responsive to said control device,*

*means to adjust the phase of the cyclic repetition of said noise energy responsive to said control device, and*

*means to obtain said message signal from the output of said correlation means.*

* * * * *

UNITED STATES PATENT AND TRADEMARK OFFICE
CERTIFICATE OF CORRECTION

PATENT NO. : RE 34,004

DATED : July 21, 1992

INVENTOR(S) : Rogoff et al.

It is certified that error appears in the above-identified patent and that said Letters Patent is hereby corrected as shown below:

On the title page, item [56]:In the section entitled "References Cited" under "U.S. Patent Documents" the following references should be added.

| | | |
|---|---|---|
| 1,761,118 | 6/30 | A.N. Goldsmith |
| 2,132,205 | 10/38 | A.C. Dichieson |
| 2,132,850 | 11/38 | M. Baesecke |
| 2,209,272 | 7/40 | J.L. Hills |
| 2,211,132 | 8/40 | P. Kotowski et al. |
| 2,292,387 | 8/42 | H.K. Markey et al. |
| 2,395,431 | 2/46 | R.M. Sprague |
| 2,395,432 | 2/46 | R.M. Sprague |
| 2,398,064 | 4/96 | K.R. Wendt |
| 2,399,469 | 7/40 | E.D. Cook |
| 2,402,058 | 6/41 | A.V. Louhgren |
| 2,402,059 | 6/46 | J.F. Craib |
| 2,406,881 | 9/46 | N.H. Young, Jr. |
| 2,410,075 | 10/46 | J.F. Hutchins, et al. |
| 2,422,664 | 6/47 | C.B.H. Feldman |
| 2,333,750 | 7/48 | A. Ptacek |
| 2,458,566 | 1/49 | L.R. Cox et al. |
| 2,463,502 | 3/49 | C.E. Atkins |
| 2,463,503 | 3/49 | C.E. Atkins |
| 2,495,727 | 1/50 | H.P. Hutshinson |
| 2,530,140 | 11/50 | C.E. Atkins |
| 2,530,142 | 11/50 | C.E. Atkins |
| 2,586,475 | 2/52 | W. Milliquet |
| 2,660,666 | 11/53 | E.J. Duckett et al. |
| 2,770,068 | 1/55 | E.N. Muller |
| 2,709,218 | 5/55 | L.E. Gabrilovitch |
| 2,777,897 | 1/57 | E. Gretener et al. |
| 2,836,657 | 5/58 | E.H.b. Bartelink |
| 2,941,202 | 6/60 | H.C. Harris, Jr. et al. |

UNITED STATES PATENT AND TRADEMARK OFFICE

CERTIFICATE OF CORRECTION

PATENT NO. : RE 34,004

DATED : July 21, 1992

INVENTOR(S) : Mortimer Rogoff, et al.

It is certified that error appears in the above-indentified patent and that said Letters Patent is hereby corrected as shown below:

| | | |
|---|---|---|
| 2,999.138 | 9/61 | C.H. Hoeppner |

Signed and Sealed this

Twenty-third Day of April, 1996

Bruce Lehman

*Attest:*

BRUCE LEHMAN

*Attesting Officer*

*Commissioner of Patents and Trademarks*